United States Patent [19]

Hines

[11] Patent Number: 4,893,468

[45] Date of Patent: Jan. 16, 1990

[54] EMISSIONS CONTROL FOR GAS TURBINE ENGINE

[75] Inventor: William R. Hines, Cincinnati, Ohio

[73] Assignee: General Electric Company, Cincinnati, Ohio

[21] Appl. No.: 126,092

[22] Filed: Nov. 30, 1987

[51] Int. Cl.$^4$ ............................................. F02C 3/30
[52] U.S. Cl. ................................. 60/39.05; 60/39.17; 60/39.53; 60/39.55; 60/261
[58] Field of Search ................ 60/39.05, 39.17, 39.55, 60/39.58, 39.59, 39.53, 261, 39.04

[56] References Cited

U.S. PATENT DOCUMENTS

| | | | |
|---|---|---|---|
| 2,243,467 | 5/1941 | Jendrassik | 60/39.17 |
| 2,476,031 | 7/1949 | Farkas et al. | 60/39.17 |
| 2,605,610 | 8/1952 | Hermitte et al. | 60/39.17 |
| 2,799,991 | 7/1957 | Conrad | 60/261 |
| 3,038,308 | 6/1962 | Fuller | 60/39.55 |
| 3,054,257 | 9/1962 | Schelp | 60/39.17 |
| 3,151,453 | 10/1964 | Lefebvre et al. | 60/261 |
| 3,238,719 | 3/1966 | Harslem | 60/39.55 |
| 3,693,347 | 9/1972 | Kydd et al. | 60/39.05 |
| 3,750,402 | 8/1973 | Vdoviak et al. | 60/261 |
| 3,765,178 | 10/1973 | Hufnagel et al. | 60/261 |
| 3,931,707 | 1/1976 | Vdoviak | 60/261 |
| 4,006,589 | 2/1977 | Schirmer . | |
| 4,128,994 | 12/1978 | Cheng | 60/39.05 |
| 4,134,260 | 1/1979 | Lefebvre et al. | 60/261 |
| 4,148,185 | 4/1979 | Somers | 60/39.17 |
| 4,498,287 | 2/1985 | Schirmer et al. . | |
| 4,519,563 | 5/1985 | Tamura . | |
| 4,569,195 | 2/1986 | Johnson | 60/39.3 |
| 4,598,553 | 7/1986 | Saito et al. . | |
| 4,631,914 | 12/1986 | Hines | 60/39.05 |

OTHER PUBLICATIONS

The Combined Reheat Gas Turbine/Steam Turbine Cycle—Part I and Part II by L. G. Rice, ASME publication, Paper No. 79-GT-7, 79-GT-8; pp. 1-7 and 1-8, respectively.
Thermodynamic Evaluation of Gas Turbine Cogeneration Cycles: Part II—Complex Analysis, by I. G. Rice, Journal of Engineering for Gas Turbines and Power, Jan. 1987, vol. 109, pp. 9 thru 15.
Steam Injection Can Improve Gas Turbines, by BG Ediss, Iver Heath, Bucks, England; Journal of Engineering for Power, Jun. 1970, pp. 114, 115, 116.
Mass Injection Gas Turbine, by C. Brett Harrison, Gas Turbine Reference Library, GER-2487.

Primary Examiner—Donald E. Stout
Attorney, Agent, or Firm—Jerome C. Squillaro; Harley R. Ball

[57] ABSTRACT

Method and apparatus for controlling the output emissions of a gas turbine engine provides an emissions combustor wherein the gas is burned locally and then thoroughly mixed with cooler unburned portions while propagating the resulting a very hot flame front is propagated over the whole gas stream flow. The emissions combustor serves to reduce the carbon monoxide content of the output. NOX can be eliminated by steam injection into the engine main combustor in combination with the emissions combustor. Combustion efficiency, which is reduced through the steam injection in the main combustor is recovered through the use of the emissions combustor. The emissions combustor can be placed at numerous locations, either as part of a main combustor staging, downstream of a high pressure turbine, or in a supplementary burner after a power turbine.

31 Claims, 4 Drawing Sheets

EMISSIONS CONTROL FOR GAS TURBINE ENGINE

This invention relates to gas turbine engines, and, more particularly, to a method and apparatus for controlling unwanted emissions from the exhaust of a gas turbine engine.

BACKGROUND OF THE INVENTION

Gas turbine engines include a combustor, wherein fuel is burned in the presence of air. Within the exhaust product of the engine are contained various emissions, some of which are detrimental to the environment. Some of these unwanted emissions include nitrous oxide, typically referred to as NOX, and carbon monoxide. Many states and local governmental groups have placed stringent requirements for limiting such unwanted emissions, and industry is now searching for various ways to meet these stringent requirements. It has been previously known that if enough water injection is introduced into the main combustor domes, NOX can be reduced considerably. For example, if sufficient water is injected, the NOX can be reduced to 8 parts per million, reference 15% oxygen by volume. However, such introduction of adequate amounts of water has been found to substantially increase the generation of carbon monoxide by as much as 150-200 times the normal carbon monoxide effluent, and as much as 900 lbs./hr. of carbon monoxide has been measured as being emitted for a 50 Mega Watt (M.W.) engine system. In addition, the introduction of these large amounts of water also result in a reduction of the combustion efficiency of typically about 2% in the operation of the engine.

Various proposals have been suggested for reducing the carbon monoxide emitted from a combustor operating with large amounts of steam and water. One proposal is a complex system, including hydrogen enrichment of the fuels. Another is to have the hydrogen directly injected into the combustor flame zones. The attempt of these approaches are both to recover the combustor efficiency and also to reduce the effluent carbon monoxide output from the combustor.

Other suggestions are to use selective catalytic reduction devices (SCR). These devices remove the carbon monoxide from the exhaust flow through a chemical process. However, this approach produces ammonia as a by-product. Other catalytic reactors are also being studies taking a different approach such as attempting to remove the carbon monoxide itself. These likewise are expensive and some have yet to be proven effective.

Accordingly, there is need for an efficient method and apparatus for controlling the combustion emissions in a gas turbine engine to reduce both the NOX and the carbon monoxide emissions to acceptable levels.

SUMMARY OF THE INVENTION

Accordingly, it is an object of the present invention to provide a gas turbine engine for reduction of the unwanted emissions in the exhaust from the gas turbine engine.

Another object of the present invention is to provide a method for controlling the emissions of a gas turbine engine.

Still a further object of the present invention is to provide an emissions combustor, in addition to the main combustor, in a gas turbine engine in order to reduce the unwanted emissions in the output of the gas engine.

Yet another object of the present invention is to provide apparatus for placement in an additional burning in a gas turbine engine, wherein the exhaust from the main combustor is locally burned at very hot temperatures, and then the very hot and cooler streams are thoroughly mixed, while propagating the hot flame front over the whole flow field.

Still a further object of the present invention is to provide an emissions combustor, which serves to reduce the amount of carbon monoxide in the gas output of a gas turbine engine, without increasing the NOX emissions.

Briefly, the present invention provides a method of controlling combustion emissions in the exhaust of a gas turbine engine. The method includes the steps of burning at very high temperatures up to about 3000 degrees F. the output of the main combustor at localized regions in an emissions combustor. The emissions combustor is added to the gas turbine engine. The hot locally burned portions are then thoroughly mixed with the cooler portions which were out of the localized regions, while propagating the resulting hot flame front over the whole face of the flowing combustion gas to thereby reduce the carbon monoxide emissions.

In an embodiment of the invention, the NOX emissions are controlled through the introduction of injected steam or water into the main combustor, in order to reduce the NOX emissions in the system.

The invention also contemplates an emission control combustor for a gas turbine engine for controlling the carbon monoxide emissions in the gas stream of the engine. The emissions control combustor includes a housing. Within the housing, there are provided means for burning at localized regions the gas stream at very high temperatures up to about 3000 degrees F. There is also provided means for thoroughly mixing the locally burned gas stream with the cooler portions of the gas stream not locally burned, while propagating the resulting hot flames in the emissions combustor over the whole flow path of the gas stream. Burning is limited to about 3000 degrees F. since above that additional NOX would be generated.

The exact placement of the emissions combustor can be either as part of the main combustor staging, or can be placed downstream of the high pressure turbine. It can also be placed in a supplemental burner downstream of the power turbine.

DESCRIPTION OF THE PREFERRED EMBODIMENTS

Figure 1:
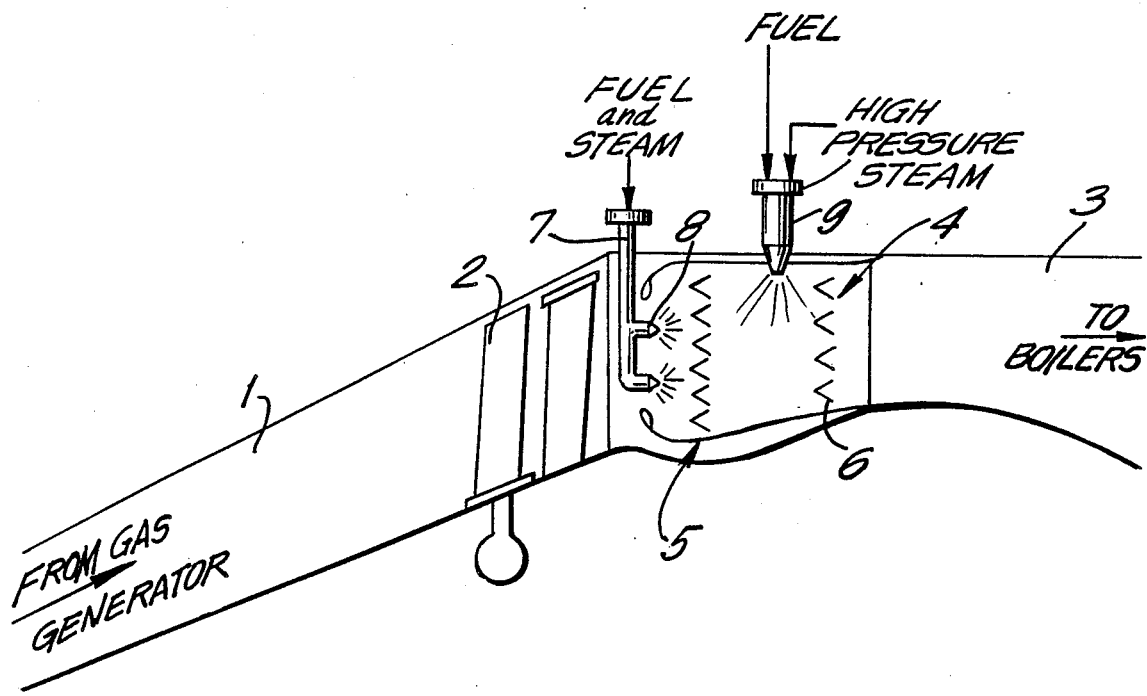
FIG. 1 is a schematic diagram showing an example of the use of an emissions combustor downstream of a power turbine as part of a supplemental combustor.

The present invention is directed towards achieving emissions control in a gas turbine engine. With such engines, there is generally provided a compressor section, including at least a high pressure compressor, and possibly also a low pressure compressor. There is included a main combustor, followed by the turbines, including at least a high pressure turbine, and possibly a low pressure turbine.

Steam is injected into the dome of either the annular or cannular type main combustor. Generally, enough steam or water is injected to lower the NOX to desired levels of 8 PPM, reference 15% oxygen by volume, without causing flame instability or flameout of the combustor. As a result of such injection, it is found that the combustion efficiency of the engine drops as the NOX is reduced. At the same time, and even more detrimentally, the carbon monoxide increases dramatically.

The present invention provides for the use of a special emissions combustor, which is added downstream of the main combustor. The special emissions combustor must be factored into the overall engine system in order to optimally produce power at the highest thermal efficiency.

The emissions combustor serves to burn the gas stream at localized regions at very hot temperatures up to 3000 degrees F. and then thoroughly mix the very hot locally burned portion with cooler portions of the gas stream while propagating the hot flame front over the whole flow of the gas.

The present invention in one form achieves emissions control in a gas turbine engine by reducing carbon monoxide in an emissions combustor separate from the main combustor of the engine. The emissions combustor burns locally at very hot temperatures and then thoroughly mixes the very hot locally burned gas and cooler streams of the flowing gas not burned while propagating the resulting hot flame front over the whole flow field.

Another form utilizes the method of eliminating NOX by the introduction of water or steam into the dome of the main combustor, in order to reduce the NOX to acceptable levels. The carbon monoxide is then reduced by providing a separate emissions combustor in addition to the main combustor.

If the burning to less than 3000 degrees F. temperature in the emissions combustor is achieved at low enough pressure, little if any additional NOX will be created. However, if additional NOX is created, additional steam can be injected into the emissions combustor to reduce the NOX that is being created. As a rule of thumb NOX generation is proportional to $e^{f(T)}$ and $P^{.37}$ for temperature and pressure respectively.

The exact placement of the emissions combustor can be at any of various locations. Specifically, the emissions combustor can be part of an additional combustor added for the purpose of achieving burning at close to stoichiometric fuel-air ratios. Specifically, in co-pending application Ser. No. 126,091, filed on Nov. 30, 1987, entitled GAS TURBINE ENGINE WITH COMBUSTOR STAGING, now abandoned, filed by the same inventor as the present application and assigned to the same assignee, the entire contents of which is herein incorporated by reference, there is described the placement of an additional combustor, in addition to the main combustor, in order to achieve burning at close to stoichiometric fuel-air ratios, while increasing the output power. Such additional combustor can be part of a main combustor staging and included along with the main combustor upstream of any turbines. Alternately, such supplemental combustor can be placed downstream of the high pressure turbine and, should a low pressure turbine also be utilized, can be downstream of the low pressure turbine. When using the additional combustor for the emissions combustor, there will be achieved the results of reductions of the carbon monoxide, as well as greater power output for the engine and burning closer to stoichiometric fuel-air ratios. Likewise, with placement of this additional emissions combustor, upstream of an output power turbine, there will, likewise, be achieved an improvement in thermal efficiency. However, the emissions control equipment can also be placed in a supplemental burner even downstream of the power turbine. In such case, although the carbon monoxide will be reduced, and power output will be increased, there will be a slight loss in the thermal efficiency.

In addition to burning out the carbon monoxide, the use of the emissions control apparatus of the present invention will also serve to recover the lost combustion efficiency that took place through the original introduction of the steam or water injected into the dome of the main combustor. The steam, generated by the boiler from the extra heat within the emissions combustor is injected back into the main combustor, where the original lowered combustion efficiency was reduced, thereby recovering the combustion efficiency.

As is schematically shown in FIG. 1, the gas from the main gas generator of a gas turbine engine having a main combustor, flows through the flow path 1 terminating in the power turbine, having the blades 2. Beyond the power turbine, there could be included recuperative heat systems, such as a boiler system or a regenerator, which would be located beyond the passage 3. A supplemental burner 4, which is placed downstream of the power turbine, includes the specially designed emissions burner 5 of the present invention, including mixing chutes 6, to be hereinafter described, and in which is introduced fuel and steam 7 to burn at localized locations at the outlet nozzles 8. As heretofore explained, should additional NOX reduction be required, steam can be introduced along with the fuel, as shown within the fuel nozzle outlet 9.

Figure 2:
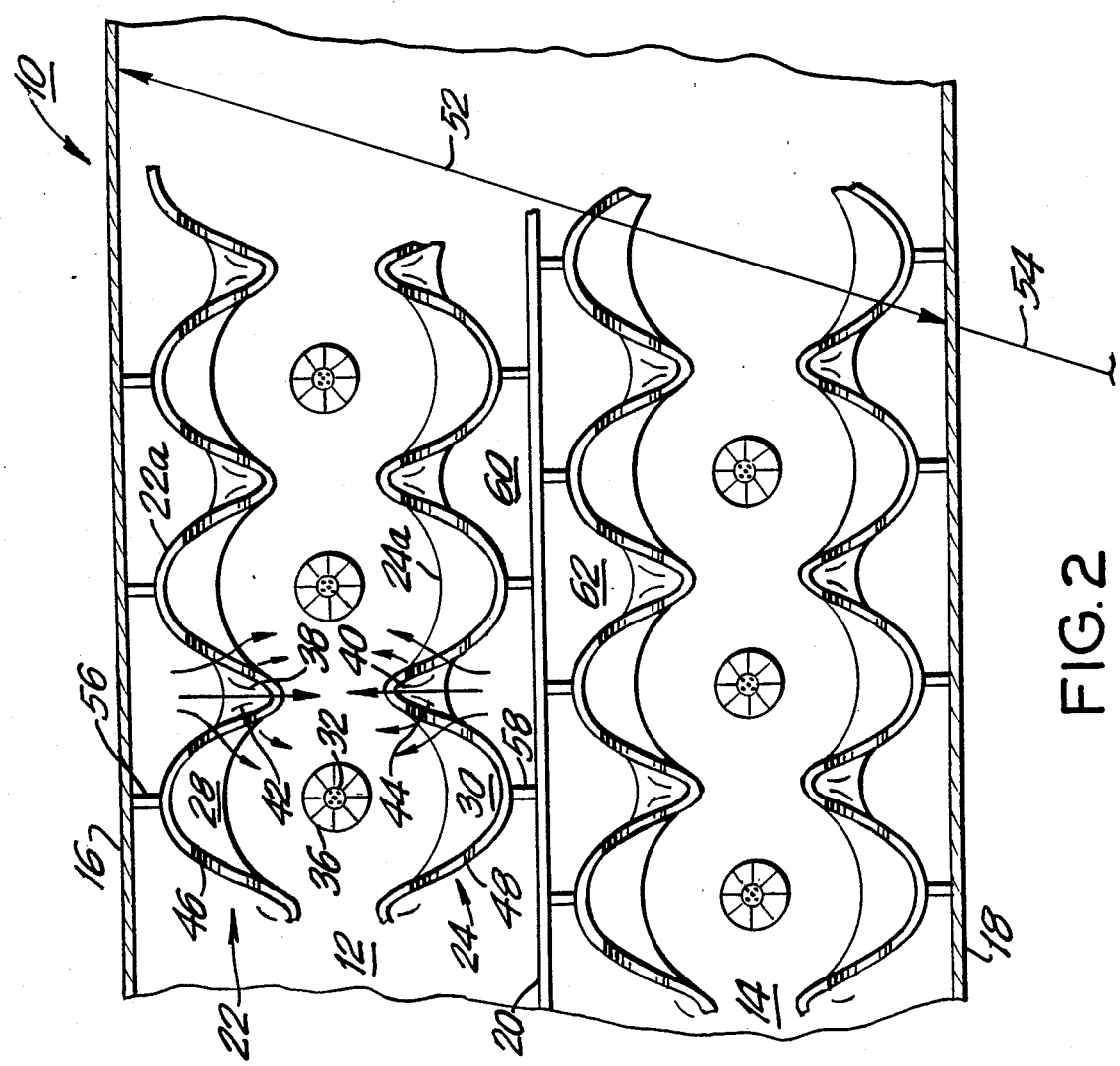
FIG. 2 is a schematic diagram showing a vertically planar section of an emissions combustor taken from aft of the combustor and looking forward into the combustor.
Figure 3:
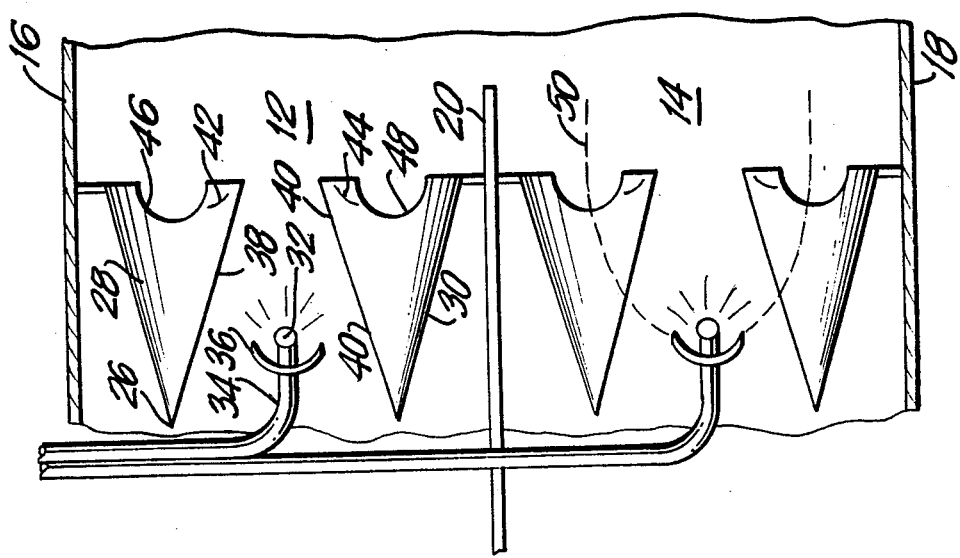
FIG. 3 is a side view of the embodiment shown in FIG. 2.

Referring now to FIGS. 2 and 3, there is shown one example of the interior of an emissions combustor in accordance with the present invention, which achieves the local burning followed by the thorough mixing of the hot and cool streams of the flowing combustion gas. Specifically, there is provided an emissions combustor, shown generally at 10 and having a double annular arrangement, including the outer annular section 12 and the inner annular section 14. The outer annular section is bounded by outer wall 16. The inner annular section is bounded by inner wall 18. The interior wall 20 serves to separate the two annular sections. Typically, the double annular sections would discharge into one annulus downstream of the burning in order to provide even more mixing.

Within each of the annular sections are provided upper mixing chutes 22 and lower mixing chutes 24.

Each of the mixing chutes 22, 24 are interconnected to the next adjacent mixing chutes, 22a, 24a, and so on, to form a continuous arrangement around the entire periphery of the annular section 12. An identical arrangement is provided in the annular section 14.

The interconnected mixing chutes can be considered as a twisted ribbon in a sine wave configuration circumferentially placed about an annular section of the emissions combustor. Analyzing one particular mixing chute 22, it is seen that the mixing chute has a forward tip 26 and proceeds aftward along a conical surface 28, which extends upwardly as it moves rearwardly. A similar conical surface 30 is provided on the lower mixing chute 24.

The upper and lower conical sections 28, 30 effectively form a funnel for the gas stream from the gas generator upstream. At the center of the funnel, there is provided the outlet 32 of a tube 34 that is fed with fuel for locally burning the gas stream at very hot temperatures. In order to further localize the burning, small swirl cups 36 can be placed around the outlet 32. If the burning is achieved at low pressures, fuel alone can be injected. However, if it is necessary to eliminate the formation of additional NOX, both fuel and steam can be injected.

Between adjacent mixing chute funnel sections, there is provided a downwardly inclined conical surface or spillway. Specifically, between the sections 22 and 22a, there is provided the downwardly angled conical surface 38. An upwardly directed mating surface 40 is provided between the adjacent sections 24 and 24a. These opposing conical surfaces redirect the flow of the portions of the combustion gas not involved in the localized burning. This gas is cooler than the gas heated in the localized burning regions. The cooler gas flows along the opposing conical surfaces and mixes with the heated gas in the adjacent funnel sections resulting from the locally burning of the combustion gas from the main combustor. Cooling louvers 42, 44 can be upwardly struck from the conical surfaces 38, 40 to provide further directivity to the cooler gas and to aid in the mixing of the cooler and heated gas portions and to provide cooling of hot metal surfaces. An annular channel 46 is cut through the walls of the upper mixing chutes 22, and a corresponding annular channel 48 is cut into the lower mixing chutes 24. Although only the upper annulus 12 has been described, it should be appreciated that an identical arrangement is provided in the lower annulus 14.

The burning can take place at temperatures which are generally lower than the temperatures in the main combustor. The temperatures in the primary zone is on average from 2700 degrees F. up to approximately 3,000 degrees F. within the burning elliptical sections shown by the dotted lines 50. Above these temperatures additional NOX would be produced. In the example shown in Table I, natural gas was used. The vitiated air entering the emissions combustor was at 847 degrees F. This represents the temperature of the cooler portions of the gas not locally heated. The locally heated portions up to about 3000 degrees F. are then mixed with the cooler portions and the resultant temperature at the exit of the emissions combustor was 1347 degrees F. providing a temperature rise of approximately 500 degrees. The temperatures entering the emissions combustor average between about 850 degrees F and 2000 degrees F dependent on placement within an engine.

The combined annulus of the emissions combustor is shown along the radial line 52 and the entire combustor is shown by the line 54.

The outer mixing chutes 22 are supported from the outer wall 16 by means of support struts 56. Similar support struts 58 retain the inner mixing chutes 24 from the interior wall 20. It should be appreciated, that with the specific structure for the mixing chutes, the heated gases are retained in the interior of the combustor, away from the outer housing walls. The cool gas passes adjacent to the housing walls. In this manner, the housing can be maintained for longer life.

Figure 4:
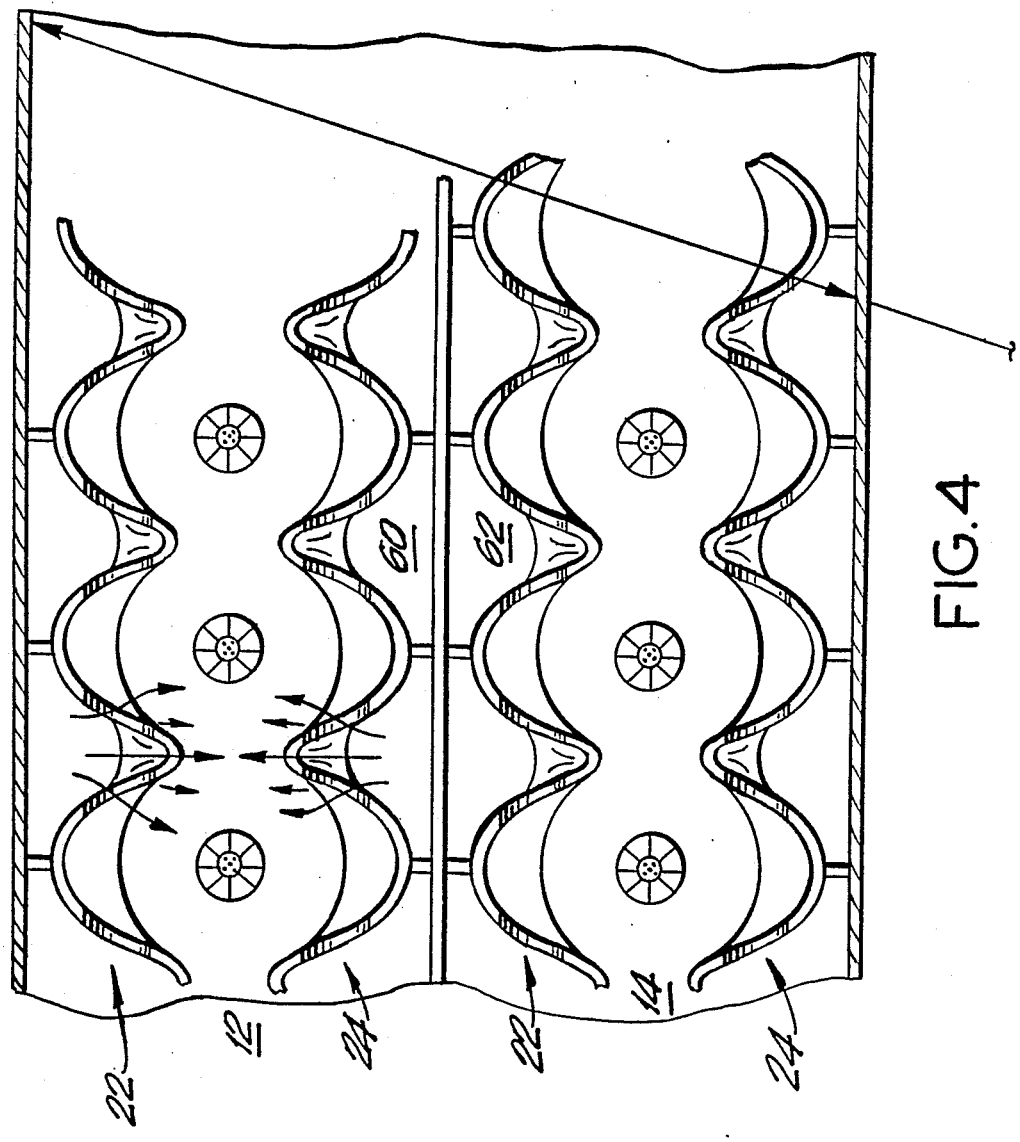
FIG. 4 is a view similar to that of FIG. 2, and showing an alternate embodiment of the present invention.
Figure 5:
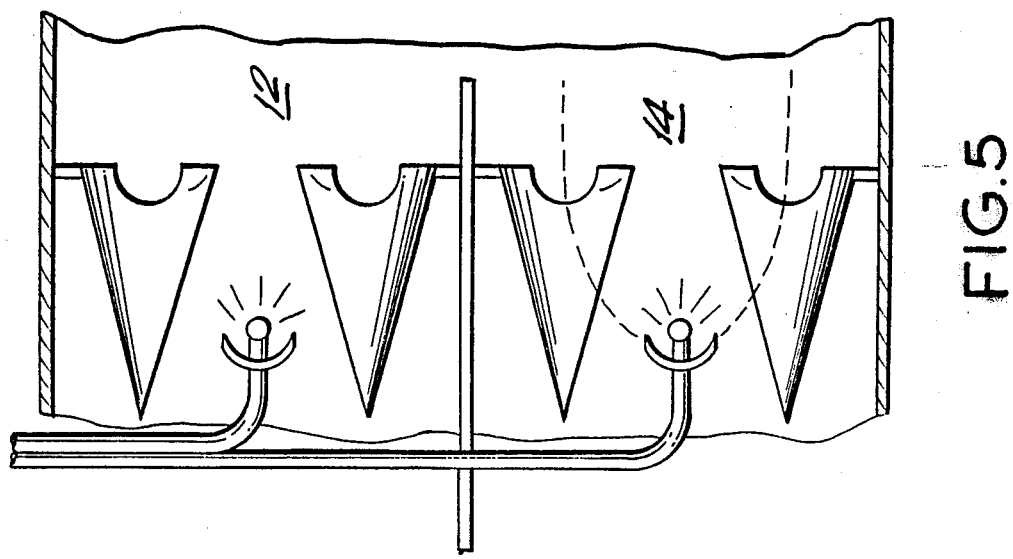
FIG. 5 is a side view of FIG. 4.

Referring to FIGS. 4 and 5, there is again shown a similar embodiment as that shown in FIGS. 2 and 3, and, accordingly, like reference numerals identify like parts. In the arrangement shown in FIGS. 4 and 5, however, it will be noted that in the outer annulus 12 and the inner annulus 14, the structures of the chutes 22, 24 are aligned with each other. In this manner, the cool air flowing within the passage 60 in the outer annulus 12 and the adjacent section 62 for cool air in the inner annulus 14 are adjacent and form a unified channel. Comparing this with the arrangement shown in FIGS. 2 and 3, it will be noted that the passageways 60 and 62 are offset. The entire arrangement within the inner annulus 14 is offset from the arrangement in the outer annulus 12. The arrangement shown in FIGS. 2 and 3 would provide for a better mixing. However, the structure of FIGS. 4 and 5 might be easier to construct.

In any event, it should be appreciated, that the specific structure shown in FIGS. 2 and 3 or FIGS. 4 and 5 provides only one example of achieving the method of burning locally at very hot temperatures for example up to 3000 degrees F. and then thoroughly mixing the very hot and cooler streams, at a lower temperature while propagating the hot flame front over the whole flow of the gas stream. Other type of structural arrangements might be introduced, which would achieve such method of the present invention. Such structure would be placed in additional burners placed downstream of the main combustor in order to reduce the carbon monoxide to acceptable levels.

As shown in Table I, introduction of steam into the main combustor dome can reduce the NOX from 35 PPM down to 8 PPM to meet the necessary required level of NOX emissions. However, in doing so, the carbon monoxide increases from 7 lbs./hr. up to 875 lbs./hr. If the engine is designed to allow for a highly efficient emissions burner with 0.995 efficiency over the entire flow field, the carbon monoxide could again be reduced down to near the original 7 lbs./hr. level. It should also be noted, that the combustion efficiency drops approximately 2% as a result of the introduction of the steam into the main combustor. However, the heat generated by the 2% combustion efficiency recovery in the emissions burner is then transferred back into the main combustor as additional steam around the main combustor. The additional steam further generated by burning to the supplementary temperature rise of about 500 degrees F. is also injected back into the engine as far forward of all the turbine stages as possible.

Utilizing an additional burner, provides an increase in the shaft horsepower output. However, as heretofore explained, by placing the emissions combustor downstream of the power turbine, there is a slight loss of system thermal efficiency. Nevertheless, even placing the emissions combustor after the power turbine still can achieve reduction of the carbon monoxide and NOX to acceptable levels. However, as was explained in the aforementioned co-pending application, and as will hereinafter be described, the emissions combustor can be placed upstream of the power turbine and, in this way, the thermal efficiency will also be improved.

Figure 6:
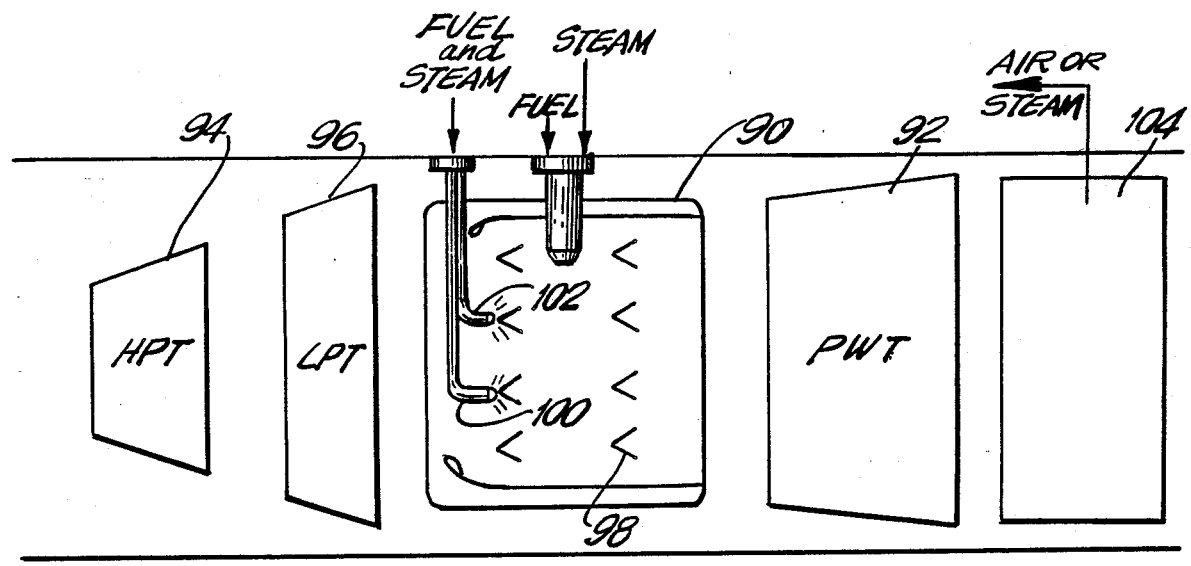
FIG. 6 is a schematic drawing showing the placement of the emissions combustor upstream of the power turbine and downstream of a high pressure turbine or a low pressure turbine.

Referring now to FIG. 6, there is schematically shown the placement of the emissions combustor 90 upstream of the power turbine 92 and downstream of the high pressure turbine 94 or low pressure turbine 96. Again, the emission control devices 98 are provided, which are fed by the fuel injections nozzles 100 and 102 for localized burning and subsequent mixture of the locally burned heated gas with the cooler gas flowing around the nozzles. At the output of the power turbine there is provided a recuperative system 104 where the recouped air or steam from a rotor thrust balanced piston device is available for forward injection.

Figure 7:
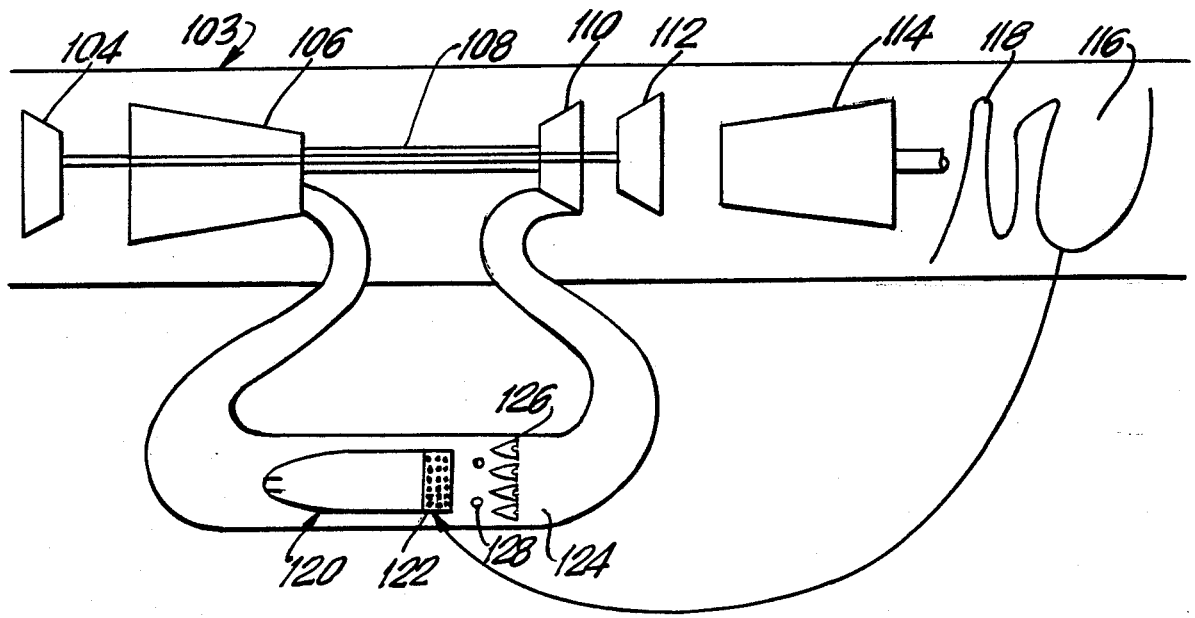
FIG. 7 is a schematic view showing the placement of the emissions combustor as part of a main combustor staging.

Referring now to FIG. 7, there is schematically shown an engine 103, including low and high pressure compressors 104, 106 driven by the dual shaft 108, which in turn are controlled by the high pressure turbine 110 and low pressure turbine 112. The output passes through the power turbine 114, after which there is provided a pressure boiler 116 for recuperating steam, which will be injected forward of the turbines. The steam is super heated through the superheater 118.

The main combustor 120 has superheated steam injected into its dome, as well as superheated steam injected around its dome. The output of the main combustor is discharged into a field of injected cooling steam 122, which lowers its temperature about 500 degrees F. like a high pressure turbine would have done. An additional stages combustor 124 is provided to again raise the flow field temperature back up another 500 degrees F. The stages combustor serves as an emissions combustor through the presence of the emission control apparatus 126 and through the provision of the fuel provided into the nozzles 128 for local burning, followed by the mixing of the heated and cooled gases.

Thus, the staged combustor not only increases the power output, thermal efficiency, and approaching burning at stoichiometric fuel-air ratios, but also provides for reduced NOX and carbon monoxide emissions.

It should be appreciated, that the present concept would also apply to double and triple rotor engines, including intercooled steam injection arrangements or any arrangement using a main combustor and any kind of exhaust recuperation system. The emissions combustor will work equally well as an engine incorporating a regenerative or air to gas heat exchanger with the same performance effects. The distinct advantage of the present idea is its simplicity. It eliminates hydrogen enriched fuels, directionally injected hydrogen gases, hydrogen generators or supplies, SCR's, catalytic convertors, etc.

The specially designed additional burner, including the emissions control equipment, must be durable and provide excellent average combustion efficiency over the entire flow field into the boiler system. The estimated burner increase in temperature is of the order of 500 degrees F. A goal of any such design would be to inject the incremental value of steam produced back into the combustor where the originally lowered combustion efficiency was reduced and resulted in the formation of the carbon monoxide in the first place. Thus, the efficiency loss is recovered.

Although the present invention has been described in connection with specific examples and embodiments, it will be recognized by those skilled in the various arts involved that other embodiments and modifications can be made without departing from the scope of the invention as represented by the appended claims.

TABLE I

| | EMMISIONS COMBUSTOR DOWNSTREAM OF POWER TURBINE (USING NATURAL GAS) | | | |
|---|---|---|---|---|
| | Base LM5000 Dry | LM5000 STIG ENGINE | LM5000 STIG ENGINE | Emissions Control Burner LM5000 STIG ENGINE |
| Fraction of steam to main combustor dome | 0 | 0.0301 | 0.0533 | 0.0533 |
| Main combustor efficiency | 0.995 | 0.995 | 0.9760 | 0.9760 |
| Parts per million NOX, reference 15% O$_2$ | 208 | 35.2 | 8 | 8 |
| lb/hr carbon monoxide | 2.4 | 6.9 | 875 | Est. less than 50 |
| Shaft HP output | 44148 | 69772 | 69772 | 126989 (+82%) |
| Shaft thermal efficiency | 0.3631 | 0.4404 | 0.4404 | 0.4270 (−1.3 pts) |
| Emissions combustor efficiency | — | — | — | 0.995 |
| °F. - power turbine discharge temperature | 846 | 764 | 764 | 847 |
| °F. - emissions combustor discharge temperature | — | 764 | 764 | 1347 |
| lb/hr - emissions combustor fuel flow | 0 | 0 | 0 | 13567 |
| lb/sec - steam flow into main combustor dome | 0 | 9.29 | 16.46 | 16.46 |
| lb/sec - steam flow around main combustor | 0 | 12.33 | 5.16 | 66.81 |
| lb/sec - steam flow into low pressure turbine | 0 | 14.0 | 14.0 | 8.4 |
| °F. steam temperature of steam into main combustor | — | 706 | 706 | 1294 |
| °F. steam temperature of steam into LPT | — | 525 | 525 | 1046 |
| °F. exhaust stack temperature | 846 | 318 | 318 | 277 |
| % change in HPT flow function | base | +6.4 | +6.4 | +37.2 |
| % change in LPT flow function | base | 0 | 0 | +1.2 |
| % change in PWT flow function | base | 0 | 0 | −20.6 |

I claim:

1. A method of controlling combustion emissions of a gas turbine engine including a main combustor operating at a first temperature to provide a gas stream, comprising the steps of locally burning portions of the gas stream at a temperature less than the first temperature in an emissions combustor to provide very hot locally heated portions of the gas stream, and thoroughly mixing the locally heated portions of the gas stream with those portions of the gas stream which are not locally burned and which are cooler portions of the gas stream, while propagating a resulting hot flame front over the gas stream flow to thereby reduce the carbon monoxide emissions.

2. The method as in claim 1, wherein said steps are conducted at a pressure location of the engine sufficiently low to avoid the generation of NOX emissions in the emissions combustor.

3. The method as in claim 1, and further comprising the step of injecting steam into the emissions combustor to prevent further generation of NOX emissions.

4. The method as in claim 1, wherein the main combustor operates on a first working fluid and including the step of introducing a second fluid into the main combustor sufficient to reduce the NOX emissions.

5. The method as in claim 1, wherein the main combustor includes a dome, and comprising the step of injecting steam into the main combustor dome sufficient to reduce the NOX emissions.

6. The method as in claim 1, wherein the emissions combustor is a supplementary burner located after a power turbine of the engine.

7. The method as in claim 1, wherein the engine further includes a high pressure turbine, and wherein the emissions combustor is downstream of the high pressure turbine.

8. The method as in claim 1, wherein the engine further includes a compressor, and a high pressure turbine, and wherein the emissions combustor is a combustor stage in series with the main combustor and located upstream of the high pressure turbine.

9. The method as in claim 5, wherein the emissions combustor generates sufficient heat to provide excess steam and further comprising the step of injecting the excess steam into the engine to recover any loss in combustion efficiency resulting from reduction of the NOX emissions in the main combustor.

10. The method as in claim 1, wherein the very high temperatures are up to approximately 3,000 degrees F.

11. An emissions combustor for a gas turbine engine for controlling the carbon monoxide emissions of the gas engine including a main combustor operating at a first temperature to provide a gas stream, said emissions combustor comprising:
a housing;
means for locally burning in the housing portions of the gas stream at a temperature less than the first temperature to provide locally heated portions of the gas stream; and
means for thoroughly mixing the locally heated portion of the gas stream, with unheated cooler portions of the gas stream in the housing, while propagating a resulting hot flame in the housing over the whole gas stream flow.

12. An emissions combustor as in claim 11, wherein said means for locally burning comprise a plurality of nozzle outlets for introducing fuel into the housing.

13. An emissions combustor as in claim 12, and further comprising swirl cups positioned around said nozzle outlets.

14. An emissions combustor as in claim 12, wherein said nozzle outlets introduce steam along with the fuel.

15. An emissions combustor as in claim 11, wherein said means for mixing comprise a plurality of mixing chutes positioned within said housing, said mixing chutes comprising flow paths for the heated portion of the gas stream, flow paths for the unheated cooler portions of the gas stream, and merging sections for thoroughly mixing the heated portions with the unheated cooler portions.

16. An emissions combustor as in claim 15, wherein said flow paths for the unheated cooler portions are adjacent structural portions of the housing, and the flow paths for the heated portions are spaced from structural portions of the housing to thereby keep the housing structure cool.

17. An emissions combustor as in claim 15, wherein said housing comprises an outer annulus, and wherein said flow paths for the heated portions of the gas stream are outwardly flared, substantially conical sections annularly positioned about the housing, adjacent conical sections being separated by converging spillways defining the flow paths for the unheated cooler portions of the gas stream, and wherein said means for locally burning comprise a fuel nozzle outlet at a center of each conical section.

18. An emissions combustor as in claim 17, wherein said housing further comprises an inner annulus, concentric with said outer annulus, and having a substantially similar internal construction.

19. An emissions combustor as in claim 18, wherein the conical sections of the outer annulus are adjacent to spillways of the inner annulus.

20. An emissions combustor as in claim 18, wherein both said inner and outer annulus feed into a common output annulus.

21. An emissions combustor as in claim 17, and comprising cooling louvers along said spillways.

22. An emissions combustor as in claim 21, wherein said louvers are upwardly struck from the spillway surface.

23. An emissions combustor as in claim 11, and further comprising a steam injection means for injecting steam into the gas engine to control NOX emissions.

24. An emissions combustor as in claim 23, and wherein said steam injection means is coupled to the main combustor.

25. An emissions combustor as in claim 23, and wherein said steam injection means is coupled to said housing.

26. An emissions combustor as in claim 11, wherein the gas turbine engine further includes in series down stream of the main combustor, a high pressure turbine, a power turbine and output boilers, and wherein the emissions combustor is located upstream of the output boiler whereby the power output of the gas turbine is increased.

27. An emissions combustor as in claim 11, wherein the gas turbine engine further includes in series downstream of the main combustor, a high pressure turbine and a power turbine, and wherein the emissions combustor is located upstream of the power turbine whereby the thermal efficiency of the turbine is increased in addition to increasing power output.

28. An emissions combustor as in claim 11, wherein the gas turbine engine further includes in series downstream of the main combustor, a high pressure turbine, a power turbine and an output regenerative air-to-gas means, and wherein the emissions combustor is located upstream of the regenerative means whereby the power output of the gas turbine is increased.

29. An emissions combustor as in claim 11, wherein the gas turbine engine further includes in series downstream of the main combustor, a high pressure turbine and a power turbine and an output regenerative air-to-gas means, and wherein the emissions combustor is located upstream of the power turbine whereby the thermal efficiency of the gas turbine is increased in addition to increasing power output.

30. An emissions combustor for a gas turbine engine for controlling the carbon monoxide emissions of the gas engine including a main combustor operating at a first temperature to provide a gas stream, said emissions combustor comprising:

a housing;

means for locally burning in the housing portions of the gas stream at an emissions combustor temperature to provide locally heated portions of the gas stream; and means for thoroughly mixing the locally heated portion of the gas stream, with unheated cooler portions of the gas stream in the housing, while propagating a resulting hot flame in the housing over the whole gas stream flow 31. The emissions combustor of claim 30 further comprising means for introducing steam into said emissions combustor.

* * * * *